UNITED STATES PATENT OFFICE.

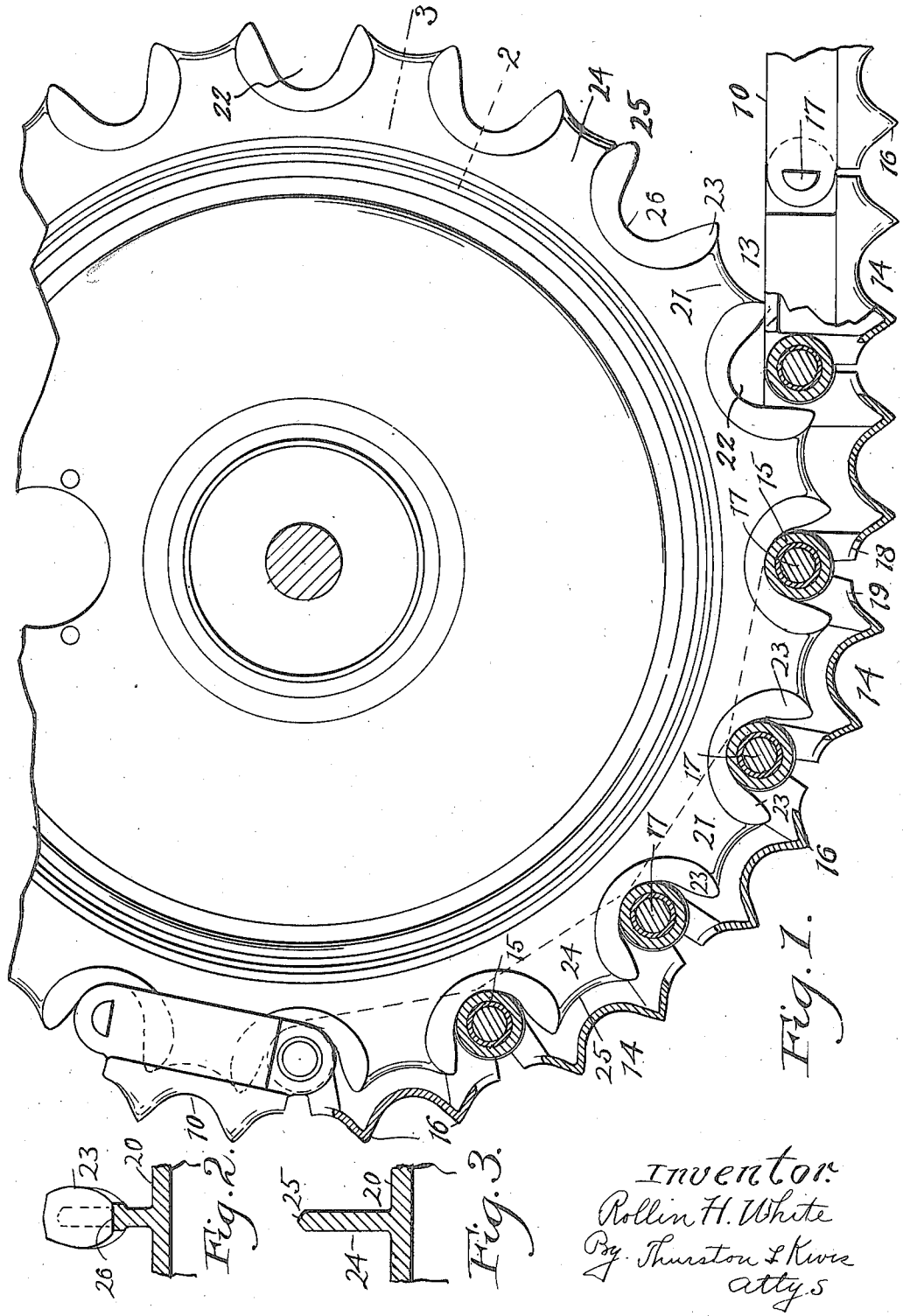

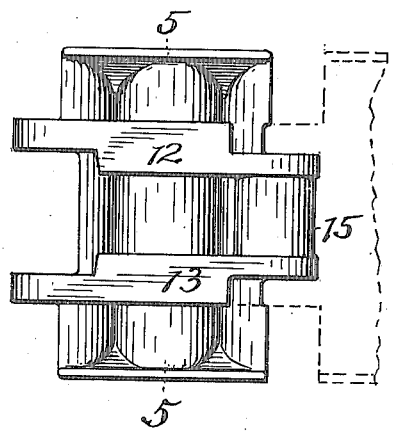
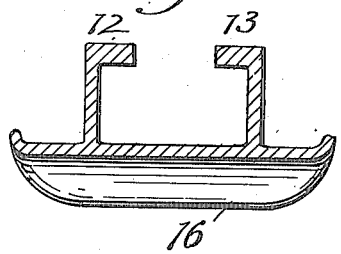
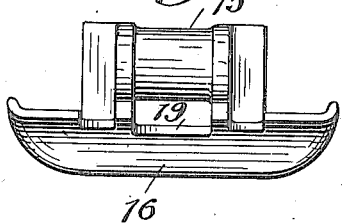
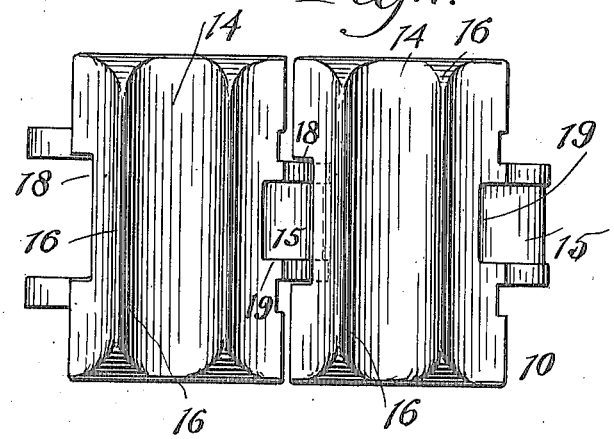
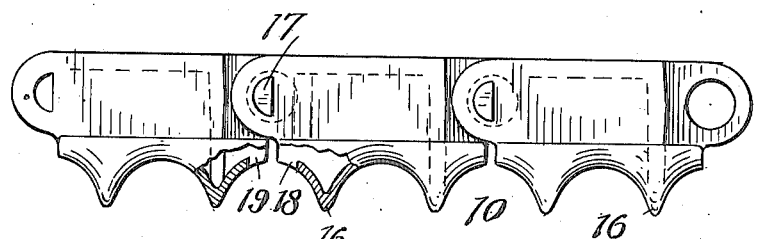

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

TRACK-LAYING TRACTOR.

1,270,576.	Specification of Letters Patent.	Patented June 25, 1918.

Application filed January 31, 1918. Serial No. 214,589.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Track-Laying Tractors of which the following is a full, clear, and exact description.

In track laying tractors, such, for example, as that shown in my Patent No. 1,253,319 granted Jan. 15, 1918, there are two endless linked traction belts, each of which runs over two wheels. One of these wheels is a driving sprocket, which, as it turns, engages the links of the traction belt and causes it to travel around these two wheels.

These tractors are used in the open; and are frequently driven through soft earth, such as plowed fields, and through deep dust and mud. Indeed the superiority of the track laying tractor over the round wheel tractor is due to its capability of successfully traversing ground of this sort. Frequently the lower or ground reaches of these track belts will substantially bury themselves in the dirt and mud.

The result is that those pockets which are necessarily in the inner sides of the links, that is to say, the upper sides of the links in the ground reaches of these belts, will become filled with dirt or mud or the like. When these links come to the driving sprockets, the teeth of the latter enter these dirt filled pockets, and if the construction were not especialv contrived to prevent such action, this dirt might be packed in the pockets to such an extent as might seriously affect the efficiency of the machine. An excessive packing of the dirt in these pockets might stretch the belt too tight to allow it to work properly. It might even break it or the sprocket teeth; or it might cause the belt to run off the sprocket wheel.

The object of this invention is not only to prevent any injurious packing of the dirt in the link pockets, but to actually act to clear out some of the dirt, and to so loosen up what is not cleared out that it may drop out when the links are inverted, as they are in the upper reach of the track belt.

The invention relates to the construction of the track belt and the link thereof, and to the construction of the driving sprocket and its teeth, whereby the latter, as they enter and move in the link pockets, act to produce the desired results as stated.

The invention consists in the construction and combination of parts shown in the drawings, hereinafter described and definitely pointed out in the appended claims.

In the drawings, Figure 1 is a side elevation of the lower part of the driving sprocket of a track laying tractor, and of a part of the track belt designed to be used therewith, a part of said track belt being in longitudinal section. Fig. 2 is a radial section of the sprocket wheel in such a plane as that indicated by line 2—2 on Fig. 1; Fig. 3 is a radial section of the outer edge of the sprocket wheel in such a plane as that indicated by line 3—3 of Fig. 1; Fig. 4 is a plan view of one of the links of the track belt; Fig. 5 is a transverse section in the plane of line 5—5 on Fig. 4; Fig. 6 is an end view of one of said links, Fig. 7 is an outside view of two of the links of said track belt; Fig. 8 is a side elevation of three connected links.

The track belt is composed of a plurality of similar links 10 which are pivoted together. The various parts of each link are preferably integral parts of the same casting. In order that the terms "upper" and "lower", as herein used, may be understood, it may be assumed that the links as described are those which for the time being are in the lower or ground engaging reach of the said track belt. These parts are a ground engaging shoe 14; two longitudinally disposed ribs 12 and 13 which extend up from the shoe and serve both as link sides and as track bars for the weight sustaining wheels to run on, and a sleeve 15 which extends between the ribs at one end of the link and are integral with said ribs. The shoe is preferably corrugated to form ground gripping transverse ribs 16; and the shoe extends, preferably, not only between but on both sides of the two ribs, so that it may have a wide bearing on the ground. Both ribs extend longitudinally beyond both ends of the shoe. At one end of the link, which may be called the wide end, the distance between the inner faces of the ribs is slightly greater than the distance between the outer faces of said ribs at the other end of the link, which may be called the narrow end. The cylindrical sleeve 15 above referred to extends between the ribs at the narrow end of the link.

The two ribs at the narrow end of the link go between the ribs at the wide end of the next link, and the hinge pintle 17 which connects two links goes through this sleeve. These sleeves are the parts of the track belt which go into the spaces between the sprocket teeth, and with which the sprocket teeth engage to cause the required movement of the track belt.

From the foregoing it is apparent that each link in the ground reach of the track belt has a pocket on its upper side. This pocket has an open top into which dirt may flow freely. The bottom of the pocket is formed by the shoe, and the side walls by the ribs. The ends of the pocket would be substantially closed by the sleeves except for the fact that the ribs extend beyond the ends of the shoe, and except for the further fact that the ends of the shoe between the ribs, (that is, the parts of the shoe which would otherwise form the bottom of the pocket at both ends thereof) are cut away, the resulting recesses in the ends of the bottom of the pocket being indicated by 18 and 19. Therefore when the links are pivoted together, as shown by means which go through the sleeves, there is at each end of each link pocket and through the bottom or shoe thereof, a hole through which the dirt which has entered the link pockets may escape, and out of which some of said dirt will be positively pushed by the sprocket teeth as they enter and move in said pocket.

The sprocket wheel 20 has a plurality of teeth 21, and between the teeth are the properly shaped recesses 22 which receive the sleeves 15. The shape of these sprocket teeth and of the walls of said interdental recesses is important to securing, in the highest degree, the desired results. What may be called the ends 23 of the sprocket teeth or the end walls of the interdental recesses are substantially as wide as the sleeves 15 are long, whereby the teeth have wide bearings on the sleeves,—and these wide edges are better adapted to push the dirt out of the link pockets. Each tooth, however, between its wide front and rear edges, has a narrow web 24 which has a V-shaped peripheral edge 25.

When, as the driving sprocket is rotating, the wide edge of a tooth enters a link pocket, it engages the dirt therein and forces it forward out through the hole in the bottom of the link pocket, formed by said recesses in the ends of the shoes. At the same time the sharp V-shaped edge of the web of the tooth, as it enters and moves in said pocket, will cut the remaining dirt, and thereby loosen it up. Since this part of the tooth is much narrower than the link pocket this loosened up dirt may move into the space between the ribs and the web of the tooth which has been cleared by the wide rear end of the tooth in said link pocket. Finally, the wide front edge of the tooth, as it moves in the pocket, stirs up that dirt so that when finally the link leaves the top of the sprocket wheel, much of that dirt will fall out of the then inverted pocket.

The bottom 26 of each interdental recess 22 is made narrower than the end walls 23 thereof, that is to say, than the ends of the sprocket teeth. It is therefore narrower than the length of the sleeve 15 so that no considerable quantity of dirt can be packed in the interdental space between the sleeve and the bottom of the said interdental space. On the contrary, on each side of the bottom of each interdental recess is room for the dirt to flow, and into which it will be caused to flow as the sleeve goes to the bottom of the interdental recess.

Having described my invention, I claim:—

1. In a track laying tractor, a track belt comprising a plurality of similar pivoted-together links, each of which is formed with a ground-engaging shoe, two longitudinal ribs projecting upward from said shoe and extending at their ends beyond both ends of the shoe, and a sleeve which extends between and joins said ribs near one end of the link, whereby a pocket is formed on the upper face of each shoe between said ribs,— the parts of the shoe at both ends thereof between said ribs being cut away to leave a recess through which dirt that enters said pocket may flow out.

2. In a track laying tractor, the combination of a track belt comprising a plurality of links pivoted together,—each having on its upper side a pocket and each having through the bottom of the link at both ends of the pocket a recess communicating with said pocket, and a driving sprocket over which said track belt runs,—said sprocket having a plurality of teeth adapted to enter said pocket, which teeth are formed with wide ends and an intermediate narrow rib.

3. In a track laying tractor, the combination of a track belt comprising a plurality of links pivoted together, each having on its upper side a pocket and each having through the bottom of the link at both ends of the pocket a recess communicating with said pocket, a driving sprocket over which said track belt runs, said sprocket having a plurality of teeth adapted to enter said pocket, each tooth being at its ends approximately as wide as the pocket, and having between said ends a narrow rib, which is knife-edged along its outer edge.

4. In a track laying tractor, the combination of a track belt comprising a plurality of links pivoted together each having on its upper side a pocket and each having through the bottom of the link at both ends of the pocket a recess communicating with said pocket, a driving sprocket over which said track belt runs, said sprocket having a plurality of spaced teeth adapted to enter said pockets, each tooth having wide ends which likewise form the ends of the interdental recesses, the bottom walls of said interdental recesses being narrower than the said ends thereof.

5. In a track laying tractor, the combination of a track belt comprising a plurality of similar links which are pivoted together, each link being formed with a ground-engaging shoe, two longitudinal ribs projecting upward from said shoe and extending at their ends beyond both ends of the shoe, and a sleeve which extends between and joins said ribs near one end of the link whereby a pocket is formed on the upper face of each shoe between said ribs,—the parts of the shoe at both ends thereof between said ribs being cut away to leave a recess through which dirt that enters said pocket may flow out,—and a driving sprocket wheel having a plurality of spaced teeth which will enter said pockets as the sprocket wheel rotates,—the ends of said teeth, which likewise form the end walls of the interdental recesses, being approximately as wide as the length of said sleeves with which they will engage, and the parts of said teeth between the wide ends thereof being formed by a narrow rib having a sharp outer edge, and the bottoms of said interdental recesses being considerably narrower than the end wall of said recesses.

In testimony whereof, I hereunto affix my signature.

ROLLIN H. WHITE.